United States Patent [19]

Slager

[11] Patent Number: 5,313,522

[45] Date of Patent: May 17, 1994

[54] APPARATUS FOR GENERATING FROM AN AUDIO SIGNAL A MOVING VISUAL LIP IMAGE FROM WHICH A SPEECH CONTENT OF THE SIGNAL CAN BE COMPREHENDED BY A LIPREADER

[76] Inventor: Robert P. Slager, 5205 Ridgebrook Dr., Kalamazoo, Mich. 49001

[21] Appl. No.: 48,075

[22] Filed: Apr. 15, 1993

Related U.S. Application Data

[63] Continuation of Ser. No. 749,150, Aug. 23, 1991, abandoned.

[51] Int. Cl.$^5$ ............................................. G10L 9/00
[52] U.S. Cl. ................................. 381/48; 381/43; 379/52; 352/50; 352/87
[58] Field of Search .......... 381/41, 43, 48, 51; 395/2, 2.44, 2.55; 364/7.7, 410; 379/52-54, 96-98, 100; 352/50, 87, 5; 382/41; 434/323, 185; 358/96

[56] References Cited

U.S. PATENT DOCUMENTS

| | | | |
|---|---|---|---|
| 4,260,229 | 4/1981 | Bloomstein | 352/50 |
| 4,546,383 | 10/1985 | Abramatic et al. | 385/85 |
| 4,563,758 | 1/1986 | Paternostro | 381/51 |
| 4,600,281 | 7/1986 | Bloomstein | 352/50 |
| 4,624,010 | 11/1986 | Takebayashi | 381/43 |
| 4,723,290 | 2/1988 | Watanabe et al. | 381/43 |
| 4,769,845 | 9/1988 | Nakamura | 381/43 |
| 4,864,622 | 9/1989 | Iida et al. | 381/41 |
| 4,907,274 | 3/1990 | Nomura et al. | 381/43 |
| 4,969,194 | 11/1990 | Ezawa et al. | 381/43 |
| 4,984,185 | 1/1991 | Saito | 364/707 |

FOREIGN PATENT DOCUMENTS 0274962  11/1987  Japan ......................................... 379/53

Primary Examiner—Dale M. Shaw
Assistant Examiner—Kee M. Tung
Attorney, Agent, or Firm—Flynn, Thiel, Boutell & Tanis

[57] ABSTRACT

A device for facilitating comprehension by a hearing impaired person of a telephone conversation includes a cord coupling to a telephone line a circuit which can convert the received audio speech signal into a series of phonemes. The circuit also includes an arrangement which correlates the series of phonemes to respective human lip shapes and displays on a display device a succession of images of the respective lip shapes. This permits the hearing impaired person to carry out lip reading of the displayed lip shapes while listening to the telephone conversation, which improves the person's level of comprehension of the conversation.

9 Claims, 1 Drawing Sheet

APPARATUS FOR GENERATING FROM AN AUDIO SIGNAL A MOVING VISUAL LIP IMAGE FROM WHICH A SPEECH CONTENT OF THE SIGNAL CAN BE COMPREHENDED BY A LIPREADER

This application is a continuation of U.S. Ser. No. 07/749,150, filed Aug. 23, 1991, now abandoned.

FIELD OF THE INVENTION

The invention relates to a device which can enhance comprehension of audio conversation and, more particularly, to a device which analyzes an audio signal and synthesizes a visual representation of the movement of human lips associated with the audio signal.

BACKGROUND OF THE INVENTION

Persons who are not totally deaf often hear certain frequencies, usually the low pitch tones, better than other frequencies. Since audible speech is made up of many different frequencies, a person with impaired hearing will typically only hear parts of words, and will therefore have difficulty comprehending what is being said. The problem is further complicated when there is noise in the background, as the frequency of background noise is often in the low end of the hearing range, where the hearing loss is usually the least. Consequently, many persons with impaired hearing rely on lip reading in association with what they are hearing in order to provide an increased level of comprehension, particularly in a noisy listening environment.

One particular situation in which lip reading cannot be used to obtain increased comprehension is where a person with impaired hearing is attempting to carry on a telephone conversation, because the standard telephone transmits only the audible sound.

It is therefore an object of the present invention to provide a device which can increase the ability of a hearing-impaired person to comprehend a telephone conversation, especially in a high background noise situation.

SUMMARY OF THE INVENTION

The objects and purposes of the invention, including those set forth above, are met by providing an apparatus which includes a circuit, an arrangement for coupling the circuit to a telephone line, and a display arrangement coupled to the circuit. The circuit includes an arrangement for breaking a received audio speech signal into a series of successive phonemes and an arrangement responsive to the series of phonemes for displaying on the display an image of human lips forming a succession of lip shapes respectively corresponding to respective phonemes in the series.

BRIEF DESCRIPTION OF THE DRAWINGS

Preferred embodiments of the invention are described in detail hereinafter with reference to the accompanying drawings, in which.

DETAILED DESCRIPTION

Figure 1:
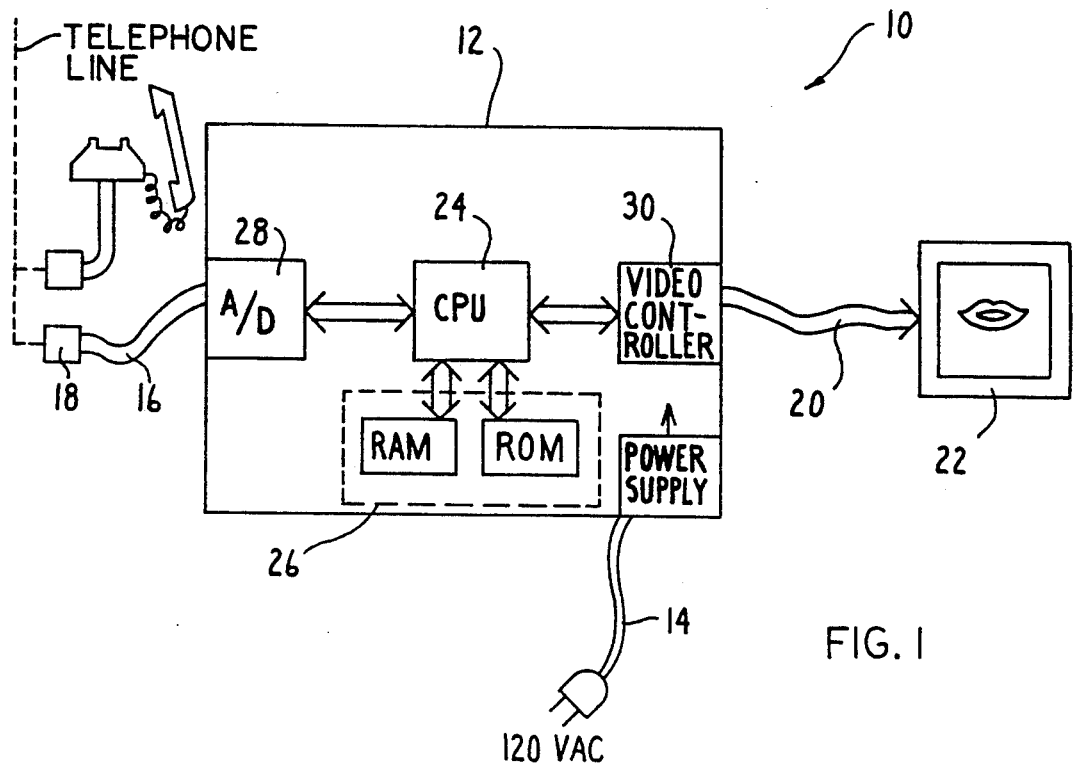
FIG. 1 is a diagrammatic view of a system embodying the present invention.

Referring to FIG. 1, a system 10 which embodies the present invention includes a conventional computer system 12 which is supplied with power through a conventional line cord 14, which can be coupled through a conventional telephone cable 16 and conventional telephone jack 18 to a telephone line, and which can be coupled by a conventional cable 20 to a conventional video display unit 22. The computer 12 includes a central processing unit (CPU) 24, a memory section 26, and an analog-to-digital (A/D) converter 28 which accepts the incoming analog voice signal from the telephone line via cable 16 and jack 18, digitizes the signal, and supplies the digital data representative of the signal to the CPU 24. The computer 12 also includes a conventional video controller circuit 30 through which the CPU 24 can display images on the video display 22. Memory section 26 includes a random access memory (RAM) in which the CPU 24 can store and retrieve data, and a read only memory (ROM) which contains a program and data constants for the CPU 24. The ROM could alternatively be a conventional hard disk unit. The CPU 24 could be a conventional microprocessor.

In analyzing the signal received from the telephone line via the A/D converter 28, the CPU 24 first examines the input stream to identify its constituent phonemes, which are by definition the smallest units of speech. Factors such as amplitude, voicing, zero-crossing rate, pitch (frequency), and changes in phonetic or spectral type are used to identify the constituent phonemes.

Once the constituent phonemes have been identified, the CPU 24 identifies for each a corresponding lip shape. In this regard, vowels may be divided into three classes according to lip shape (puckered, relaxed and extended), and three classes according to opening of the mouth (narrow, medium and wide).

Diphthongs are classified into two groups based on the final movement of the diphthong:
1. Final movement of the diphthong is puckered, as in found, phoned and mute.
2. Final movement of the diphthong is relaxed and narrow, as in mike, gate or boy. Consonants are divided into four groups:
   1. Those formed and revealed by the lips:
      a. lip shut movement such as p, b, or m.
      b. lower lip moves to teeth for f or v.
      c. puckered variable as for w or wh.
   2. Those formed by the tongue and revealed by the lips:
      a. puckered corner movement as for r.
      b. extended narrow as for s, z or a soft c.
      c. a lip projecting movement as for sh, ch, zh or a soft g.
   3. Those formed and revealed by the tongue:
      a. tongue to teeth movement as for th, whether voiced or voiceless.
      b. pointed tongue to gum movement as for l.
      c. flat tongue to gum movement as for t, d or n.
   4. Those revealed by context:
      a. relaxed narrow as for y.
      b. throat movement as for k, hard c, hard g or ng.
      c. breath without movement as for h.
5. Other lip shapes are for: ah, aw, oo, ee and er.

As evident from the foregoing discussion, the various constituent elements of speech correspond to several lip shapes. These lip shapes are stored in the memory 26 in the form of respective graphics images, each arranged in a conventional graphics format. Consequently, as the respective constituent components of an incoming audio speech signal are successively identified, they can be successively displayed on the video unit 22. Thus, a person watching the video unit 22 while listening on the telephone will see a sequence of lip movements corresponding to the identified components of speech, which presents the illusion of talking lips. Therefore, the person can carry out lip reading while talking on the telephone and thus have an increased level of comprehension of the conversation. It will be recognized that, by appropriate graphics processing techniques, each lip image presented on the display can be gradually changed in shape in order to change it into the next lip shape, which obviously provides a more continuous representation of lip movement on the screen, which in turn makes lip reading easier and increases comprehension.

Figure 2:
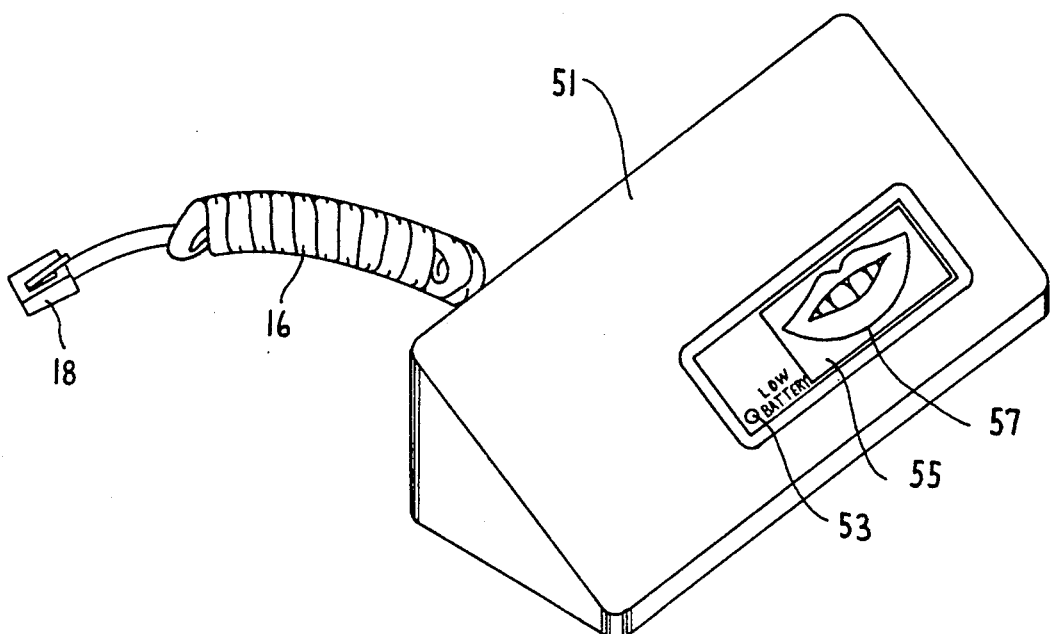
FIG. 2 is a perspective view of an alternative embodiment of the system of FIG. 1.

FIG. 2 is a perspective view of an alternative embodiment of the system of FIG. 1. The system of FIG. 2 includes a wedge-shaped housing 51 which contains a computer system similar to that illustrated at 12 in FIG. 1, and which can be coupled to a telephone line by a cord 16 and jack 18 equivalent to those of FIG. 1. One difference between these two systems is that the system of FIG. 2 is powered by a conventional and not-illustrated battery located within the housing 51, a light emitting diode 53 is provided on a front panel of the housing 51, and a conventional and not-illustrated battery monitoring circuit is provided within the housing 51 to monitor the battery power and to illuminate the light emitting diode 53 when the battery has too little energy to properly power the computer system but still has sufficient energy to illuminate the light emitting diode.

A second and more significant difference between the systems of FIGS. 1 and 2 is that, rather than a separate video display of the type shown at 22 in FIG. 1, the system of FIG. 2 has on the front panel of the housing 51 a liquid crystal display (LCD) 55 which can display at 57 an image of a pair of human lips. The LCD 55 is coupled to the computer within the housing 51 in a conventional manner, and is capable of selectively displaying at 57 a selected one of several different images which each show human lips forming a respective one of the lip shapes mentioned above. The system of FIG. 2 operates in substantially the same manner as the system of FIG. 1, except that the image of human lips appears on the LCD display 55 instead of on the screen of the video display 22 of FIG. 1.

Two preferred embodiments of the invention have been described in detail for illustrative purposes, but it will be recognized that there are variations or modifications of the disclosed apparatus, including the rearrangement of parts, which lie within the scope of the appended claims.

For example, it will be recognized that the invention is not limited to the English language, but could be used with any spoken language.

It will also be recognized that, instead of images of human lips, the displayed images could show a person with hands and arms forming words of the manual "signing" language commonly used by the deaf. In this case two or more successive phenomes would typically identify a single appropriate "sign" to be displayed.

Moreover, it will be recognized that the disclosed devices could be used not only with a telephone line, but with any electrical audio signal, such as the signal supplied to the speaker of a radio, a television, or a stereo system.

I claim:

1. An apparatus comprising: a circuit, means for coupling said circuit to a line carrying an audio speech signal, and display means coupled to said circuit, said circuit including means for breaking the audio speech signal into a series of successive phonemes representative of vowels and consonants, and means responsive to said series of phonemes for generating and for displaying on said display means an image of moving human lips substantially synchronized in real time to said audio speech signal and having an accuracy which permits a person with lipreading skills to comprehend a substantial portion of a speech content of the audio speech signal through lipreading of said image, said image including a succession of lip shapes respectively corresponding to respective said phonemes in said series of phonemes.

2. An apparatus of claim 1, wherein said display means includes a computer video display unit.

3. An apparatus of claim 1, wherein said display means includes a liquid crystal display component.

4. An apparatus of claim 3, including a wedge-shaped housing having said liquid crystal display component supported thereon, wherein said line is a telephone line, and wherein said means for coupling said circuit to said telephone line includes a telephone cord having a first end coupled to said circuit in said housing and having a second end which is disposed externally of said housing and which has a telephone jack.

5. An apparatus of claim 4, including a battery in said housing for powering said circuit, and a low battery indicator provided on said housing, said circuit including means responsive to a low energy state of said battery for actuating said indicator.

6. An apparatus of claim 1, wherein said circuit includes a computer system having a central processing unit, and includes memory means having stored therein a library of phonemes and corresponding human lip shapes.

7. An apparatus comprising: a circuit, means for providing at an input to said circuit an audio speech signal, and display means coupled to said circuit, said circuit including means responsive to the audio speech signal for determining a phonetic content of said audio speech signal which is representative of vowels and consonants embodied in said audio speech signal, for synthesizing from said phonetic content an image of human lips forming a succession of lip shapes representative of said phonetic content, and for displaying on said display means said synthesized image of human lips forming said succession of lip shapes, said image being substantially synchronized in real time to said audio speech signal and having an accuracy which permits a person with lipreading skills to comprehend a substantial portion of a speech content of said audio speech signal through lipreading of said image.

8. An apparatus comprising: a circuit, means for supplying to an input of said circuit an audio speech signal, and display means coupled to said circuit, said circuit including means for breaking the audio speech signal into a series of successive phonemes representative of vowels and consonants, and means for associating with each of said phonemes in said series a respective image of human lips forming a respective lip shape which corresponds to the phoneme, and for displaying on said display means each of said images in an order corresponding to the order in said series of the associated phonemes, said image being substantially synchronized in real time to said audio speech signal and having an accuracy which permits a person with lipreading skills to comprehend a substantial portion of a speech content of said audio speech signal through lipreading of said image.

9. An apparatus of claim 8, further comprising means responsive to said audio speech signal for generating audible sound waves representative of said audio speech signal.

* * * * *